(12) United States Patent
Schulz

(10) Patent No.: US 8,919,852 B2
(45) Date of Patent: Dec. 30, 2014

(54) ACTUATOR

(71) Applicant: Faurecia Innenraum Systeme GmbH, Hagenbach (DE)

(72) Inventor: Martin Schulz, Karlsruhe (DE)

(73) Assignee: Faurecia Innenraum Systeme GmbH, Hagenbach, DE (US)

( * ) Notice: Subject to any disclaimer, the term of this patent is extended or adjusted under 35 U.S.C. 154(b) by 19 days.

(21) Appl. No.: 13/678,239

(22) Filed: Nov. 15, 2012

(65) Prior Publication Data

US 2013/0118089 A1   May 16, 2013

(30) Foreign Application Priority Data

Nov. 15, 2011   (DE) .......................... 10 2011 118 576

(51) Int. Cl.

| | | |
|---|---|---|
| *B60R 7/04* | (2006.01) | |
| *E05F 15/00* | (2006.01) | |
| *E05B 83/28* | (2014.01) | |
| *B60R 7/00* | (2006.01) | |
| *B60R 7/06* | (2006.01) | |
| *E05B 47/02* | (2006.01) | |
| *E05C 19/16* | (2006.01) | |

(52) U.S. Cl.

CPC ................. *E05F 15/00* (2013.01); *E05B 83/28* (2013.01); *B60R 7/00* (2013.01); *B60R 7/06* (2013.01); *E05B 47/026* (2013.01); *E05C 19/16* (2013.01)

USPC .......................................... 296/37.12; 49/423

(58) Field of Classification Search

CPC .................................... E05F 15/00; B60R 7/04

USPC ............ 296/24.34, 37.1, 37.8, 37.12; 49/423; 292/137, 138, 163, 175, DIG. 11; 224/281

See application file for complete search history.

(56) References Cited

U.S. PATENT DOCUMENTS

| | | | | | |
|---|---|---|---|---|---|
| 38,080 | A | * | 3/1863 | Hill | 292/224 |
| 924,502 | A | * | 6/1909 | Schaller | 292/336 |
| 1,115,332 | A | * | 10/1914 | O'Brien | 292/335 |
| 1,368,041 | A | * | 2/1921 | Malone | 292/164 |
| 1,394,635 | A | * | 10/1921 | Maturo | 292/181 |
| 1,486,998 | A | * | 3/1924 | Wiley | 292/169.11 |
| 1,811,004 | A | * | 6/1931 | Flynn | 292/169.19 |
| 1,850,516 | A | * | 3/1932 | Ross | 292/182 |
| 2,106,955 | A | * | 2/1938 | Moffitt | 292/335 |
| 2,281,317 | A | * | 4/1942 | McFarlane | 292/164 |
| 5,076,620 | A | * | 12/1991 | Campbell et al. | 292/138 |
| 5,460,309 | A | | 10/1995 | Nehl et al. | |
| 5,558,385 | A | * | 9/1996 | Gross et al. | 296/37.12 |

(Continued)

*Primary Examiner* — Pinel Romain
(74) *Attorney, Agent, or Firm* — Reising Ethington P.C.

(57) ABSTRACT

An actuator for moving a drawer and a cover for an opening in an interior panel part of a vehicle, which, for covering an opening formed in an interior panel part, can be moved between a closed state for covering the opening and an open state for uncovering the opening. The actuator includes a guiding device that guides the movements of the drawer out of and into the opening, a cover opening and closing device that opens and closes the cover, and an unlocking and locking device that unlocks and locks the drawer. The unlocking and locking device includes a bolting device that locks the drawer in a retracted state and an adjustment device that interacts with the bolting device and cover opening and closing device in such a way that moving the cover in its open state causes the adjustment device to release the bolting device with the drawer in its retracted state, so that the drawer can be moved out of the opening.

18 Claims, 4 Drawing Sheets

(56) References Cited

U.S. PATENT DOCUMENTS

| | | | | |
|---|---|---|---|---|
| 6,065,729 | A * | 5/2000 | Anderson | 248/311.2 |
| 6,709,032 | B2 * | 3/2004 | Huang | 292/201 |
| 6,830,277 | B2 * | 12/2004 | Zierle et al. | 296/37.12 |
| 6,837,408 | B2 * | 1/2005 | Dieringer | 224/483 |
| 6,854,779 | B2 * | 2/2005 | Gehring et al. | 296/37.12 |
| 7,490,875 | B2 * | 2/2009 | Najima | 292/216 |
| 7,494,170 | B2 * | 2/2009 | Hanzel et al. | 296/37.12 |
| 7,607,703 | B2 * | 10/2009 | Cho | 292/304 |
| 7,607,727 | B2 * | 10/2009 | Park | 297/188.19 |
| 8,196,972 | B2 * | 6/2012 | Lutzke | 292/140 |
| 2006/0197353 | A1 | 9/2006 | Hanzel et al. | |
| 2007/0200360 | A1 * | 8/2007 | Cavallucci et al. | 292/216 |
| 2009/0250958 | A1 * | 10/2009 | Karaki et al. | 296/37.5 |

* cited by examiner

ACTUATOR

TECHNICAL FIELD

The present invention relates to an actuator for moving a drawer and a cover in a vehicle.

BACKGROUND OF THE INVENTION

Described in prior art are interior panels, in particular known as dashboards, which exhibit a glove compartment at suitable locations, typically on the passenger side in the case of dashboards. These interior panels or dashboards usually exhibit several layers of varying function: a carrier layer, which can be provided with an intermediate layer that is applied to the carrier layer, and a decorative layer, which is secured to the visible side of the intermediate layer facing the passenger cabin. A cover of the glove compartment often consists of the carrier, intermediate and decorative layer, which is pivoted by a hinge to the carrier layer of the dashboard. The cover has to be opened in order to gain access to the storage area of the glove compartment. In terms of user friendliness, the disadvantage to known solutions is that the objects located in the storage compartment are most often hard for the user to see, and that the user has to bend toward the front to be able to get at the contents of the storage compartment.

SUMMARY OF THE INVENTION

An object of the present invention is to provide an actuator for moving a drawer and a cover, which makes it possible to achieve an improved functionality for a user making use of such drawer in a vehicle interior.

This and other objects may be achieved by means of an actuator with the features described below.

One embodiment according of invention is an actuator for moving a drawer and a cover for covering an opening formed in an interior panel. The cover can be moved between a closed state for covering the opening and an open state for uncovering the opening, and the drawer can be moved between a retracted state and an extended state in which the drawer protrudes from the opening. The actuator comprises a guiding device for guiding the movements of the drawer out of and into the opening, a cover opening and closing device for opening and closing the cover, and an unlocking and locking device for unlocking and locking the drawer. The unlocking and locking device comprises a bolting device for locking the drawer in the retracted state, and an adjustment device that interacts with the bolting device and the cover opening and closing device in such a way that moving the cover in its open state causes the adjustment device to release the bolting device with the drawer in its retracted state, so that the drawer can be moved out of the opening.

The advantage to the above is that the actuator makes it possible to convert a rotational movement by the cover of a drawer into a translatory motion, in order to activate a locking and unlocking device. Furthermore, the actuator according to the invention makes it possible, by moving the cover, to ensure access to a drawer, in particular a push loading drawer, which in its retracted state with the cover closed is secured against inadvertently sliding out. The actuator makes it possible to unlock the drawer safeguard in a simple process of opening the cover, so that the drawer can be moved.

In one embodiment of the actuator, the adjustment device interacts with the bolting device and the cover opening and closing device in such a way that, by moving the cover into its closed state, the adjustment device locks the bolting device of the drawer in its retracted state, so that the drawer is locked in the retracted state. The advantage to this is that the drawer is secured with the cover closed, and does not inadvertently move while the vehicle is traveling, impacting the closed cover, possibly damaging it.

In another embodiment of the actuator, the drawer is slidably mounted by means of at least one guide rail for guiding the movements of the drawer out of and into the opening. The drawer pre-tensioned in the retracted state and/or in the extended state by means of a pre-tensioning device, which is mounted on the drawer and a thrust bearing. The advantage to this is that the drawer can be moved into a position where the user can easily access the contents of the drawer, wherein pulling out the drawer presents the user with the contents, without the user having to bend over excessively to search for the contents. Furthermore, the user can use the extended drawer as a tray.

In another embodiment of the actuator, the pre-tensioning device exhibits a first tensile or compressive force generating means, in particular a roll spring that acts on the drawer in order to push/pull the drawer into the extended state. The advantage to this is that the user can comfortably access the contents of the drawer, since the drawer has moved toward the user. As a consequence, the user can more comfortably get to the contents in the drawer.

In another embodiment of the actuator, the pre-tensioning device exhibits a second tensile or compressive force generating means, in particular a roll spring that acts on the drawer in order to pull/push the drawer into the retracted state. Also conceivable as the tensile or compressive force generating means in addition to elastic springs are elastic plastics like rubber bands, and also electric drives, which provide the required tensile and compressive force by way of suitable gearboxes, such as a rack and pinion gear.

In another embodiment of the actuator, the cover opening and closing device exhibits a retaining arm, which is pivoted to the cover by means of a pivot bearing, and can move around a rotational site to open and close the cover.

In a further embodiment of the actuator, the cover opening and closing device exhibits a second retaining arm, which is pivoted to the cover by means of a pivot bearing, and can move around a second rotational site that is offset relative to the first rotational site in such a way as to restrict the opening motion of the cover. The advantage to this is that the cover cannot extend a great distance into the shin and knee region of the passenger cabin, so that the passenger has more space available even with the cover opened.

In another embodiment of the actuator, a setting lever is secured to the first and/or second rotational site in such a way that the setting lever synchronously follows the motion of the first retaining arm and/or the second retaining arm. The advantage to this is that the rotational motion of the cover can be imparted to the setting lever.

In another embodiment of the actuator, the end section of the setting lever opposite the first rotational site is provided with an engaging attachment that interacts with the adjustment device to lock and unlock the bolting device. The engaging attachment or engaging segment can be a projection made out of a suitable material formed on the setting lever. Further, it is also possible for the engaging attachment to be a pin secured to the setting lever at a suitable location. The engaging attachment may also be referred to as the engaging portion.

In another embodiment of the actuator, the adjustment device exhibits a pre-tensioned control slide valve, which has an engaging attachment receptacle into which the engaging attachment of the setting lever can mesh, and which has a control segment for actuating the control segment of the bolt, and can be moved between an engaging attachment locking position for meshing the engaging attachment of the setting lever with the engaging attachment receptacle and a released state for unlocking the bolting device. The engaging attachment receptacle can be a protruding plate or bracket, which has a suitable width into which the engaging attachment can mesh. The control segment preferably exhibits a ramp segment with a predetermined inclination and height, wherein the height of the ramp corresponds roughly to the unlocking path of the bolt. The engaging attachment receptacle may also be referred to as the receiving portion.

In an embodiment of the actuator, the control slide valve is pre-tensioned into a locked state with the bolting device by means of a tensile force generating means, in particular a tension spring, and pre-tensioned out of the locked state of the engaging attachment receptacle and the engaging attachment by means of a compressive force generating means, in particular a compression spring. The advantage to this is that the control slide valve is slidably mounted for coupling with the engaging attachment of the setting lever.

In another embodiment of the actuator, the bolting device comprises a bolt, which is pre-tensioned in a locked state with the drawer by means of a compressive force generating means, in particular a compression spring, which is coupled with the compressive force generating means, and which exhibits a barrier section for engaging onto a latching attachment of the drawer in order to lock the drawer in its retracted state. The advantage to this is that the drawer is secured in place in the retracted state. Electric drives or suitable gear mechanisms may also be used as the compressive force generating means.

In another embodiment of the actuator, the bolt further comprises a second control segment which interacts with the first control segment of the control slide valve in such a way that the motion of the control slide valve in its released state for unlatching the bolt causes the barrier section of the bolt to disengage from the latching attachment of the drawer. The control segment preferably exhibits an inclination similar to the control segment of the control slide valve, and is also ramp-shaped, wherein the height of the control segment roughly corresponds to the unlocking path of the bolt.

In one embodiment of the actuator, the control slide valve is pre-tensioned by means of a tensile force generating means, in particular a tension spring, into an initial state in which the control segment of the control slide valve is engaged with the control segment of the bolt.

In another embodiment of the actuator, the control slide valve is acted upon by a compressive force generating means, in particular a compression spring, which pre-tensions the control slide valve in the opposite direction of the tensile force generating means. A floating mount makes it possible to reuse the engaging attachment on the control slide valve, so that the control lever can again activate the control slide valve.

BRIEF DESCRIPTION OF THE DRAWINGS

Additional advantages, features and details of the invention may be gleaned from the following description of a preferred exemplary embodiment, as well as based on the drawing; the latter shows.

DETAILED DESCRIPTION OF THE ILLUSTRATED EMBODIMENTS

For a better understanding, FIGS. 1 to 9 each depict a reference system with x, y and z axes, wherein the x-axis points in the direction of a vehicle as it travels forward during use as intended, and the z-axis points in the vertical direction of the vehicle, while the y-axis points in the transverse direction of the vehicle.

Among other things, the actuator 1 according to the invention makes it possible to convert a rotational movement by a cover 30 for a drawer 40 into a translatory motion, so as to activate a locking device and unlocking device 6, 7.

Figure 1:
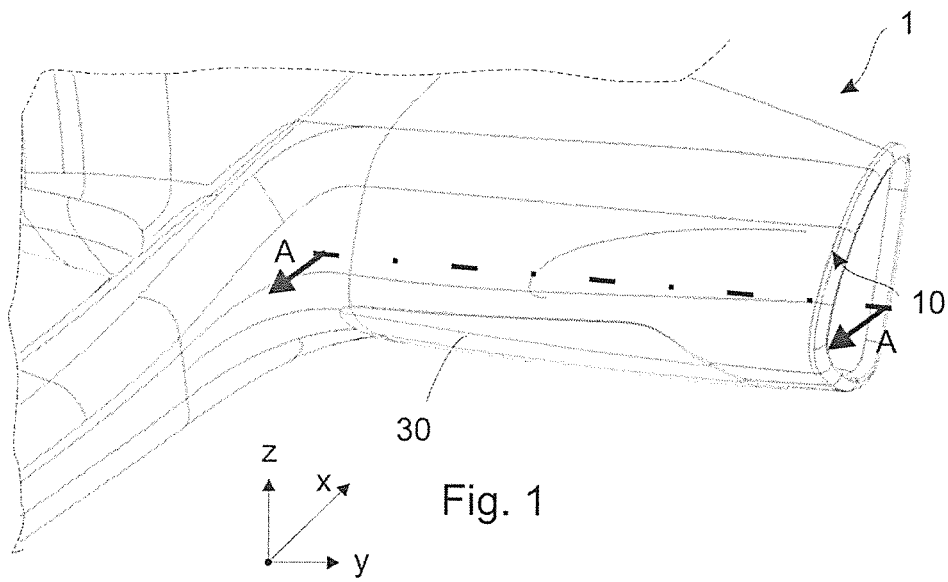
FIG. 1 a partial view of the visible side of an interior panel part on the passenger side of a vehicle, wherein a cover that is moved by the actuator according to the invention is depicted in a closed state.

FIG. 1 presents a partial view of the visible side 10 of an interior panel part 1, here the passenger side of the interior panel part 1. Shown at the lower section of the interior panel part in the direction of the shin and knee region of a passenger cabin is an opening 8 for a drawer 40, in particular a storage compartment or a push loading drawer of a glove compartment, which can be closed by a cover 30 depicted in a closed state.

Figure 2:
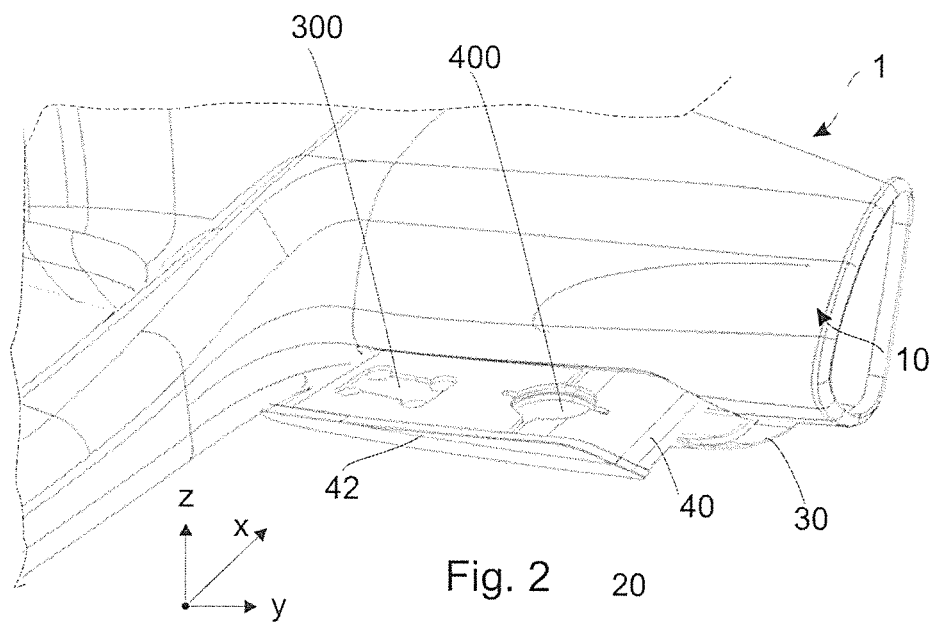
FIG. 2 a partial view of the visible side of an interior panel part on the passenger side of a vehicle, wherein the cover is depicted in an open state, and a drawer that is moved by the actuator according to the invention is depicted in an extended state.

FIG. 2 shows the interior panel part 1 from FIG. 1, in which the cover 30 is depicted in an open state, so that a passenger can get to the objects contained in the drawer 40. In the embodiment presented on FIG. 2, the drawer 40 exhibits a region with a charging station 300 for electronic devices, such as mobile telephone systems, mp-3 players, etc., and a cup holder 400. In a preferred embodiment of the drawer, the charging station 300 is configured for the contactless charging of accumulators for various electronic devices, wherein a corresponding induction coil is provided in the charging station for charging the accumulators. In order to better grasp the cover 30, the side facing the visible side 10 of the cover 30 can be provided with a handle, or an unlocking button is furnished for activating the locking and unlocking device 6, 7 of the actuator 2 and/or turning on a drive mechanism that opens the cover 30. In an embodiment of the actuator 2 according to the invention, the cover 30 can be designed so that the weight of the cover alone would cause it to move in an open state, and the lever gear hinged to the cover and comprised of lever arm 70, setting lever 80 and control side valve 90 can be activated, and act against the tensile and compressive forces of the springs 45.1, 46. In this embodiment, the cover 30 is locked in position in the closed state by means of a holding magnet and/or an unlockable holding bolt on the opening 8.

FIG. 2 presents one of many possible ways in which the drawer 40 of the actuator according to the invention can be configured. The drawer 40 can also be designed as a push loading drawer or storage compartment just for holding objects and/or as connection and storage options for electronic devices and other objects.

Figure 3:
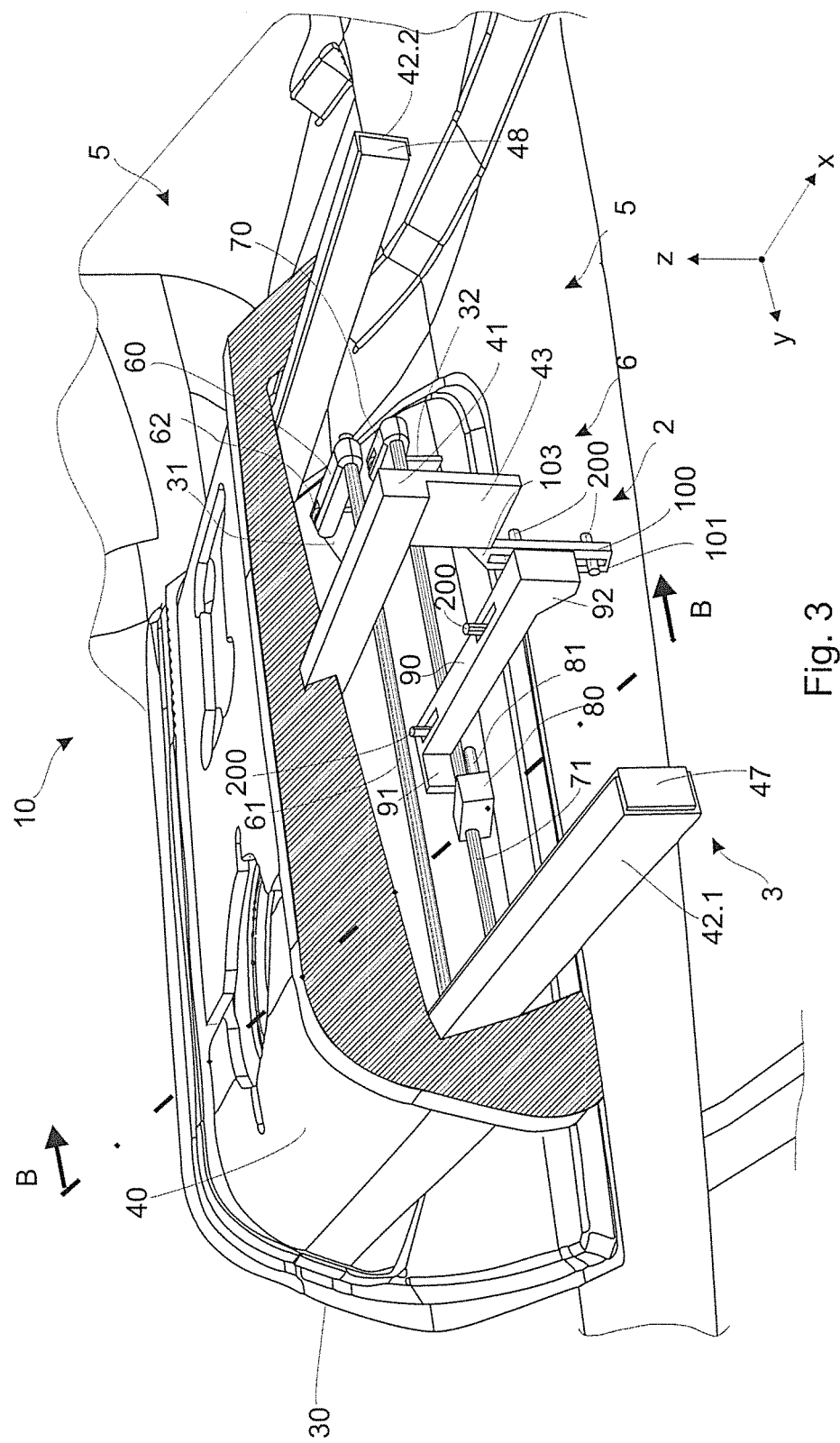
FIG. 3 a perspective side view of the actuator according to the invention viewed oppositely to the vehicle direction toward the rear side of the cover based on cross section A-A from FIG. 1, wherein the cover is in a closed state, and the drawer is in a retracted state.

FIG. 3 shows a partial sectional view of the actuator 2 according to the invention on an interior space 5 from the opposite side toward the visible side and in the opposite x-direction toward a rear end section 42 of the drawer in a retracted state and on the cover 30 in a closed state. The drawer 40 is only partially depicted on FIG. 2, so that the components of the actuator 2 and the guiding devices 42.1 and 42.2 of the drawer 40 are visible. The drawer is guided at its two lateral guiding sections 47 and 48 spaced apart from each other in the y-direction in a U-profile by means of guide rails 42.1 and 42.2, so that the drawer can move out of the retracted state shown on FIG. 2 into an extended state depicted on FIGS. 2 and 7 in the x-direction in a translatory manner. The guiding sections can be coupled with damping means, such as silicone brakes, thereby allowing the drawer to move as softly as possible into the extended and retracted state.

Figure 4:
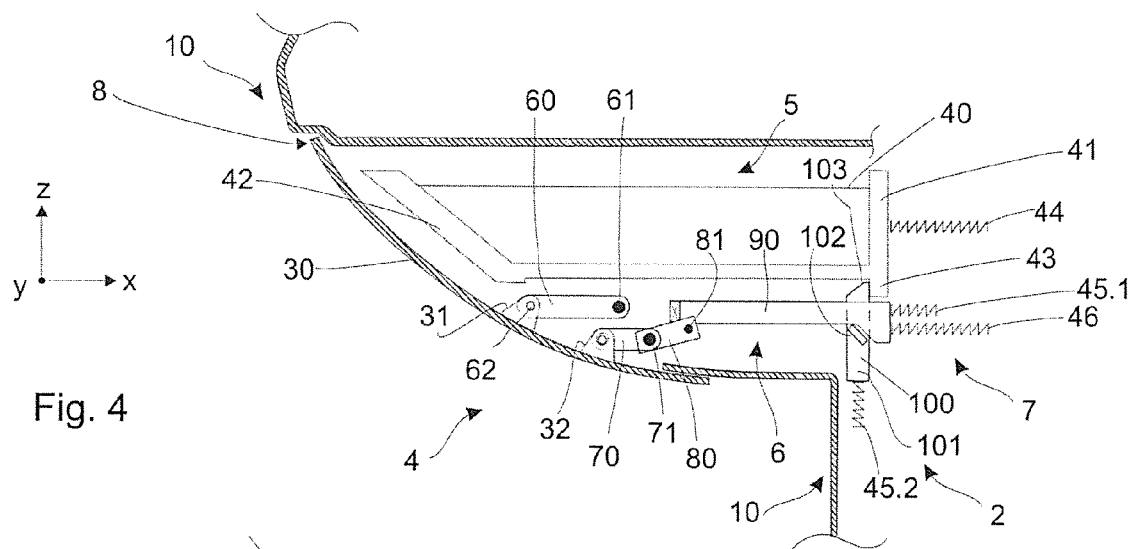
FIG. 4 a sectional view of the actuator according to the invention based on cross section B-B from FIG. 2, wherein the cover is in a closed state, and the drawer is in a retracted state.

In an embodiment depicted on FIG. 4, the drawer 40 is pre-tensioned by means of a compressive force or tensile force generating means, such as a compression spring or tension spring 44, in particular a roll spring, so that the drawer 40, when freely movable, is moved into the extended state by the compressive force or tensile force generating means 44. In order to enable an especially soft sliding by the drawer 40 out of the opening, the guiding sections 47, 48 or other suitable locations of the drawer can be provided with suitable brakes, such as silicone brakes. For this purpose, a suitable side of the drawer 40 can be provided with a toothed rack, which is coupled with the silicone brake by means of a gearbox, such as a toothed wheel. To achieve an especially soft sliding by the drawer 40, the guiding device 3 of the drawer 40 can also be coupled with other damping means, such as air dampers.

In the exemplary embodiment shown on FIG. 4, the end section 41 of the drawer 40 is pre-tensioned in the extended state with a compression spring 44. In another embodiment not depicted, the drawer is additionally or only pre-tensioned with corresponding compressive force or tensile force generating means in such a way that the compressive force or tensile force generating means moves the drawer 40 into the retracted state. In the embodiment shown, corresponding compression or tension springs are provided as the compressive force and tensile force generating means. Other embodiments of the actuator 2 can also provide electronically driven gearboxes, such as toothed or worm gears, for generating the required tensile and compressive forces, wherein a corresponding electronic controller is furnished.

In order to prevent the compressive force or tensile force generating means from moving the pre-tensioned drawer 40 against the cover 30 without impediment, the end section 41 of the drawer 40 is provided with a locking or latching attachment 43, which interacts with a bolting device 7 of the unlocking and locking device 6, 7 of the actuator 2 according to the invention.

The bolting device 7 exhibits a bolt 100, which interacts with the latching attachment 43 of the drawer in such a way as to block any movement by the drawer 40 when the bolt 100 is engaged with the latching attachment 43, so that the compressive force or tensile force generating means or a user is unable to move the drawer 40 in the extended state. The bolt 100 is slidably guided in the z-direction by means of guide pins 200, which are secured to a suitable location on the interior 6 on the side of the interior panel part facing away from the visible side 10 and/or some other part of the vehicle.

As evident from FIGS. 3 and 4, the bolt 100 exhibits a first end section 101, which a compressive force generating means, here in the form of a compression spring, acts upon, and pre-tensions the bolt in a z-direction against the drawer 40, pressing it so as to engage with the latching attachment 43. Formed at the end of the bolt 100 opposite the first end section 101 is a barrier section 103, which interacts with the latching attachment 43 of the drawer to block its movement toward the opening 8 if the barrier section 103 has engaged the latching attachment 43.

To release the pre-tensioned drawer 40 so that it can move into the extended state, the bolt 100 can be moved out of the locked state into an unlocked state, in which the bolt 100 and its barrier section 103 are disengaged from the latching attachment 43 of the drawer.

The bolting device 7 exhibits the bolt 100 with the end section 101 and latching attachment 103, the barrier section 103 and the compression spring 45.2.

The bolting device 7 can also exhibit other embodiments. For example, the bolt 100 can be moved into the locked and unlocked state by an electric drive, wherein a suitable toothed rack or worm gear is provided, for example.

The traveling motion of the bolt 100 can also be a swiveling, rotational and translatory movement in other directions that deviate from or follow the directions of the x, y, z-axes, so as to achieve the respective locked state and unlocked state.

The advantage to being able to move the drawer 40 toward the passenger and out of the opening in the interior panel part is that the user has easy access to the objects contained in the drawer 30. Furthermore, there is no need for additional lighting in the drawer 30.

In order to move the bolt 100 into the unlocked state, the actuator 2 according to the invention exhibits an unlocking device or adjustment device 6 in the embodiment shown on FIG. 3 to 9. The adjustment device 6 in the embodiment of the actuator 2 according to the invention depicted on FIG. 3 to 9 is a control slide valve 90 that can move in the x-direction and is pre-tensioned by means of a tension and compression spring 46, 45.1. To this end, the control slide valve 90 is movably mounted in a suitable manner in the interior 5 by means of guide pins 200. In order to move the bolt 100 into the unlocked state, the control slide valve 90 exhibits a control segment or control attachment 92, which is engaged with a control segment 102 of the bolt 100 in the initial position, as shown on FIG. 4.

Furthermore, a tension spring 46 and a compression spring 45.1 act on the control slide valve 90, wherein the tension spring 46 pre-tensions the control slide valve 90 away from the initial position, as depicted on FIG. 4, and away from the opening 8, wherein the compression spring 45.1 acts in the opposite direction of the tension spring 46 to prevent the control slide valve from moving out of the initial position.

The traveling motion of the control slide valve 90 can also be a swiveling, rotational and translatory movement in other directions that deviate from or follow the directions of the x, y, z-axes, so as to achieve the respective locked state and unlocked state of the bolt 100 by means of the control slide valve 90.

The unlocking motion of the control slide valve 90 out of the initial position and toward the opening so as to disengage the lock between the bolt 100 and latching attachment of the drawer 40 is induced by means of the control slide valve 90 and a setting lever 80, which is shifted into the open state of the cover 30 via a retaining arm 70 by the movement of the cover 30. For this purpose, the end section of the setting lever 80 opposite the retaining arm 70 exhibits an engaging attachment or engaging portion 81, which meshes with an engaging attachment receptacle or receiving portion 91 of the control slide valve 90. When the cover 30 is moved into the open state, the retaining arm 70 pivoted to the cover 30 moves the setting lever in such a way that the engaging attachment 81 of the setting lever 91 acts on the engaging attachment receptacle 91, and pulls the setting slide valve 90 toward the opening, wherein the control segment 92 of the control slide valve 90 acts on the control segment 102 of the bolt 100, causing the bolt 30 to release the drawer 40, so that the latter can be moved out of the retracted state into the extended state.

As evident from FIG. 2, the setting lever 80 can be moved around a rotational site 71 at the end opposite the engaging attachment 81, here a rotational axis, to which the setting lever 80 is secured in a torque-proof manner, so that a rotational motion of the axis 71 also causes the setting lever to move.

In order to transfer the rotational motion of the cover 30 while moving the cover in the extended state, a retaining arm 70 is pivoted to the cover 30 by means of a pivot bearing 32. When the cover 30 is moved in the extended state, it causes the retaining arm 70 to move. The end of the retaining arm 70 opposite the pivot bearing is joined in a torque-proof manner with the axis 71, and conveys the motion to the axis 71, and hence to setting lever 80 that activates the setting slide valve 90, so that the bolt 100 disengages from the drawer 40. In the exemplary embodiment shown on FIG. 3, both sides of the axis 71 are provided with retaining arms 70, wherein FIG. 3 depicts only one retaining arm 70. The second retaining arm 70 is covered by the guiding section 47 of the drawer 40, and thus is not visible from the perspective view shown on FIG. 3. For example, if the cover 30 exhibits smaller dimensions, so that the retaining arms lie closer together, only one retaining arm 70 may be required per axis 71.

The cover 30 can be detachably coupled at a suitable site against the interior panel part 8 defining the opening 8 by means of a magnet, so that the cover is held in the closed state shown on FIG. 4.

The retaining arm 60 is pivoted at one end to the cover 30 by means of a pivot bearing 31, and secured at the other end to a rotational axis 61, and its job is to limit the extent to which the cover can swivel open in the knee region. The advantage to this is that the cover 30 can minimally swivel into the knee and shin region of the passenger compartment, so that more room can be made available to the passenger, wherein the passenger simultaneously has especially good access to the objects contained in the drawer 30.

Reference is made to FIG. 4 to 7, which show the process of opening the cover and the associated process of releasing the lock between the drawer 40 and bolt 100, so that the drawer 40 can be moved into an extended state.

FIG. 4 shows the cover 30 in a closed state, so that the opening 8 in the interior panel part 1 is closed. The bolt 100 is engaged with the latching attachment 43 of the drawer 40, and thereby prevents the drawer 30 from being moved into an extended state by the compression spring 44. The control slide valve 90 is held in the initial position shown on FIG. 4 by the compression and tension spring 45.1, 46.

Figure 5:
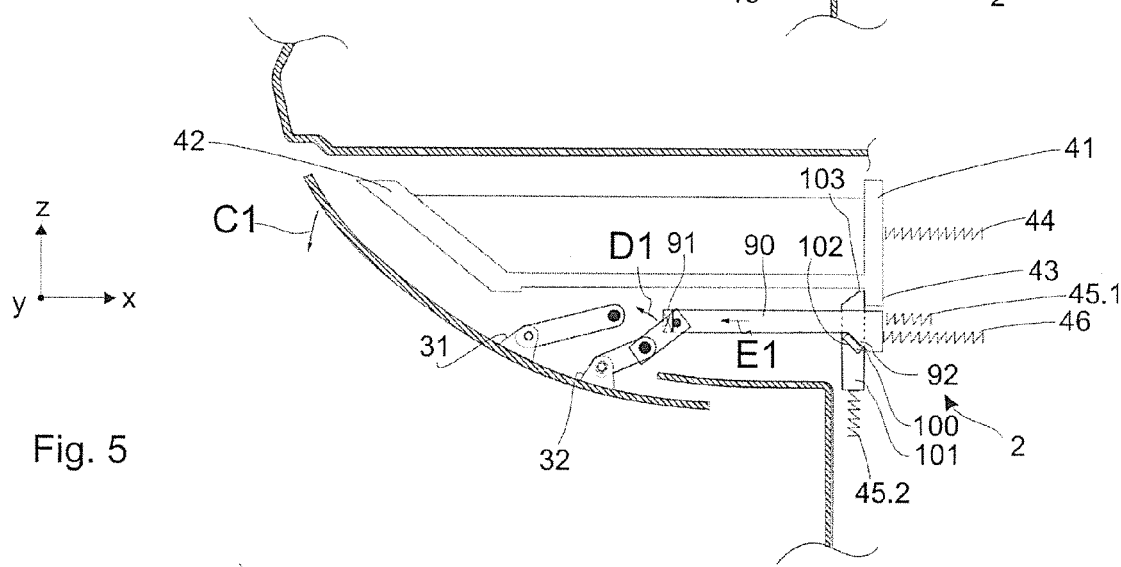
FIGS. 5 and 6 sectional views of the actuator according to the invention and the cover and the drawer, the intermediate steps in the motion processes of the actuator according to the invention, the cover and the drawer toward an open state of the cover and an extended state of the drawer.

FIG. 5 depicts the cover 30 and actuator 2 in an intermediate position of the opened state for the cover 30 and actuator. The cover 30 is moved away from the opening by a user according to arrow C1. The control slide valve 90 is translatorily shifted in the direction of the opening 8 by the movement of the cover 30 via the retaining arm 70, which transfers the motion of the cover to the axis 91, and hence to the setting lever 80. As a result, the setting lever 80 is made to rotate according to arrow D1, causing the control slide valve 90 to shift toward the opening 8 according to arrow E1. This causes the inclined control segment 92 of the control slide valve 90 to move the correspondingly arranged control segment 102 of the bolt 100, thereby shifting the bolt 100 away from the latching attachment 43 of the drawer 30.

Figure 6:
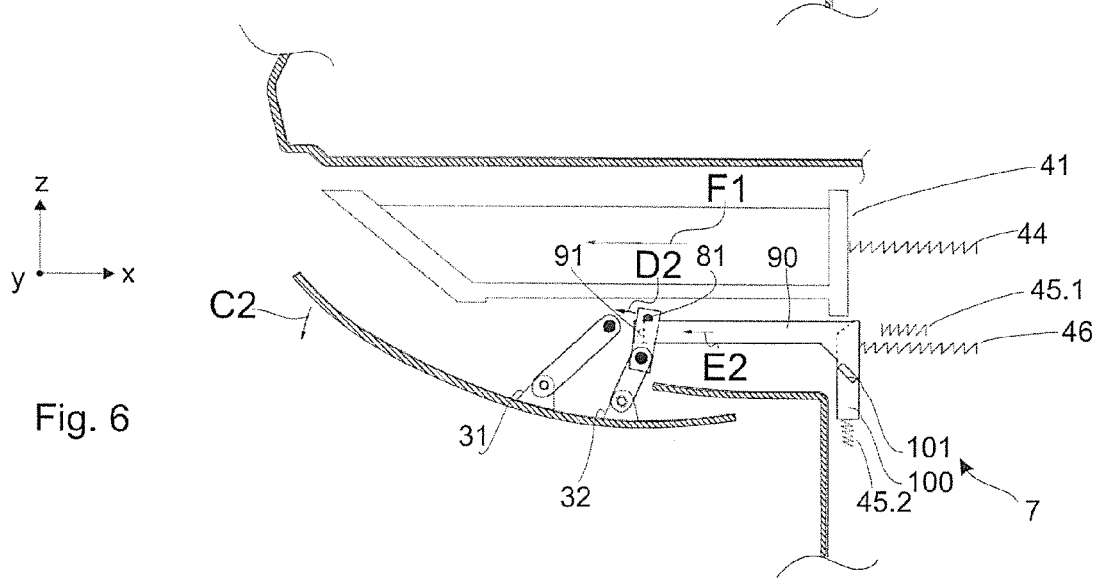

The bolt 100 on FIG. 6 has been disengaged from the latching attachment 43 of the drawer 40 by the control slide valve 90, and the cover 30 is not yet in a completely opened state. The compression spring 45.1 is disengaged from the control slide valve, wherein the tension spring 46 pre-tensions the control slide valve 46 in its initial position. The drawer 40 can now be moved by the compression spring 44 into the extended state, as denoted by arrow F1, while the cover swivels further into the opened state, as denoted by arrow C2. The engaging attachment 81 of the setting lever 80 is swiveled by the continued pivoting motion D2 of the cover via the lever 70, the axis 71 and the setting lever 80 over the engaging attachment receptacle 91 of the control slide valve 90. On FIG. 6, the engaging attachment 81 is still engaged with the engaging attachment receptacle 91 of the control slide valve 90, wherein the control slide valve is moved further in the direction of the opening according to arrow E2 via the further lowering of the cover 30 and the lever kinematics comprised of the retaining arm 70 and setting lever 80.

Figure 7:
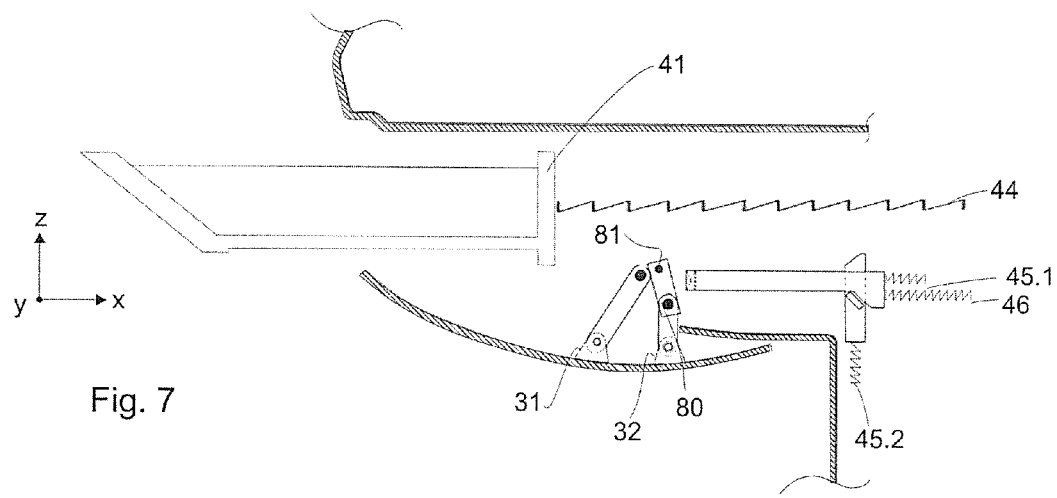
FIG. 7 a sectional view of the actuator according to the invention, wherein the cover is depicted in an open state, and the drawer is depicted in an extended state.

FIG. 7 depicts the cover 30 in the final extended state, wherein the retaining arm 60 prevents the cover 30 from swiveling open further. The drawer 40 has been moved into the extended state by the compression spring 44. The setting lever 80 has been moved further by the retaining arm 70 and axis 71, so that the engaging attachment 81 is disengaged from the engaging attachment receptacle 91 of the control slide valve 90. As a consequence, the tension spring 46 can move the control slide valve 90 back into the initial position shown on FIG. 7, as already depicted on FIG. 7.

Figure 8:
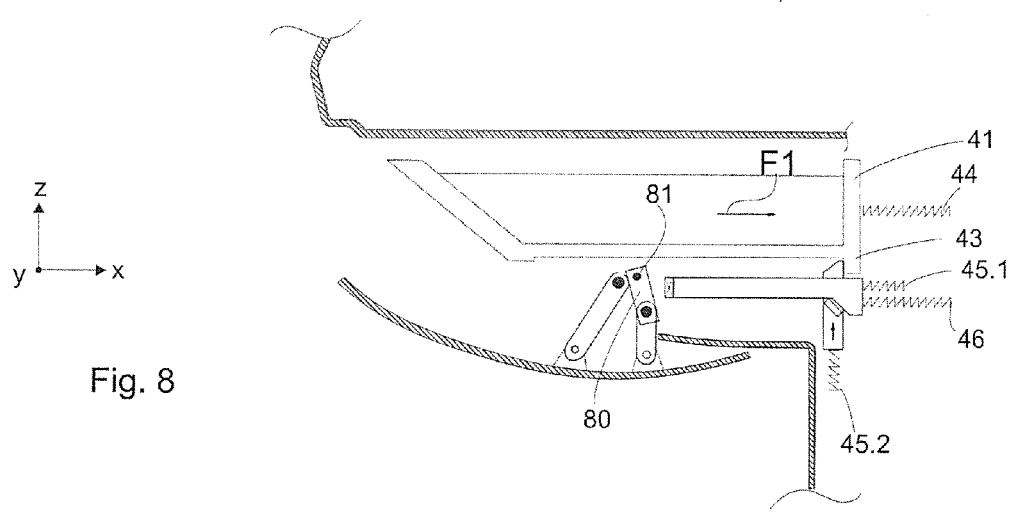
FIG. 8 a sectional view of the actuator according to the invention, the cover and the drawer, wherein the drawer is again depicted in its retracted state for closing the cover.
Figure 9:
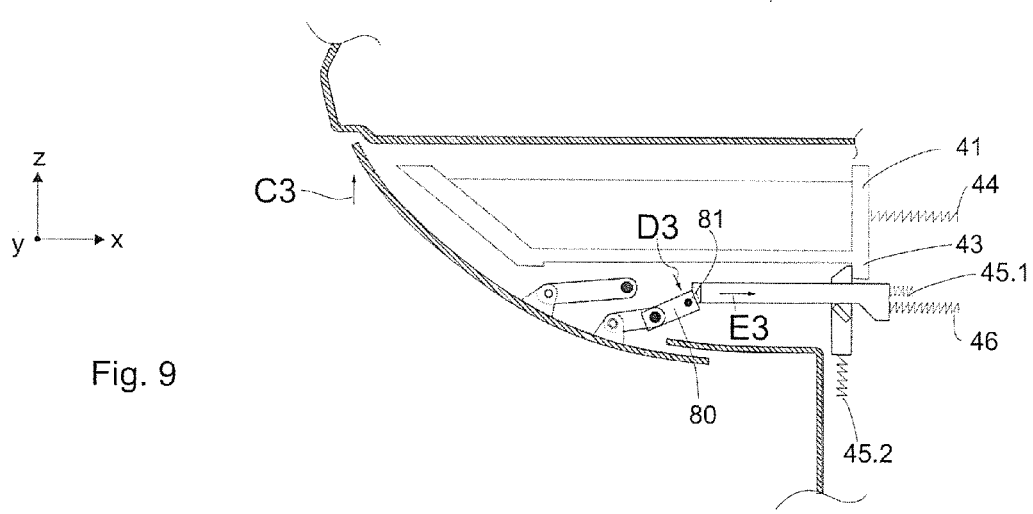
FIG. 9 a sectional view of the actuator according to the invention, the cover and the drawer, wherein the drawer is again depicted in its retracted state, and the cover is depicted in a closing motion, so as to again shift the cover and actuator into the state shown on FIG. 1.

Reference is made in the following to FIGS. 8 and 9, which show a movement of the drawer 40 into the retracted state, and closing of the cover into the closed state.

According to FIG. 7, the drawer 30 is moved into the retracted state according to arrow F2 by a user or a suitable drive, until the latching attachment 43 of the drawer has again engaged with the barrier section 103 of the bolt 100.

According to FIG. 9, the cover 30 is hereafter moved into a closed state for closing the opening 8 according to arrow C2, wherein the rotational movement of the cover turns the setting lever 80 according to arrow D3, and presses the engaging attachment 81 of the setting lever 80 against the engaging attachment receptacle 91 of the control slide valve 90, so that the control slide valve 90 is moved against the compression spring 45.1 according to arrow E3, allowing the engaging attachment 81 of the setting lever to hide away under the engaging attachment receptacle 91 of the control slide valve, and swivel upward on the other side of the engaging attachment receptacle 91 as shown on FIG. 4 when the compression spring 45.1 again presses the control slide valve 90 into the initial position according to FIG. 4.

The invention claimed is:

1. An actuator for moving a drawer and a cover in a vehicle, wherein the cover can be moved between a closed state for covering an opening in an interior panel part and an open state for uncovering the opening, and wherein the drawer can be moved between a retracted state and an extended state in which the drawer protrudes from the opening, the actuator comprising:
   a guiding device that guides the drawer during movement between the retracted and extended states;
   a cover opening and closing device comprising a retaining arm coupled to the cover at a pivot bearing for pivotal movement around a rotational site to open and close the cover; and
   an unlocking and locking device that unlocks and locks the drawer, wherein the unlocking and locking device comprises:
   a bolting device that locks the drawer in the retracted state; and
   an adjustment device that interacts with the bolting device and cover opening and closing device in such a way that, with the drawer in the retracted state, moving the cover toward the open state causes the adjustment device to release the drawer by moving the bolting device so that the drawer can be moved out of the opening.

2. The actuator according to claim 1, wherein the adjustment device interacts with the bolting device and the cover opening and closing device in such a way that, with the drawer away from the retracted state, moving the cover to the closed state causes the bolting device to lock the drawer in the retracted state.

3. The actuator according to claim 1, wherein the drawer is slidably mounted by at least one guide rail for guiding the drawer during movement between the retracted and extended states, and the drawer is pre-tensioned in the retracted state and/or in the extended state by a pre-tensioning device mounted on the drawer and on a thrust bearing.

4. The actuator according to claim 3, wherein the pre-tensioning device comprises a spring, which acts on the drawer to move the drawer toward the extended state.

5. The actuator according to claim 4, wherein the pre-tensioning device comprises a second spring, which acts on the drawer to move the drawer toward the retracted state.

6. The actuator according to claim 1, wherein the cover opening and closing device comprises a second retaining arm coupled to the cover at a pivot bearing for pivotal movement around a second rotational site that is offset relative to the other rotational site in such a way as to restrict the opening motion of the cover.

7. The actuator according to claim 6, further comprising a setting lever secured to one or both of the rotational sites for synchronous movement with one or both of the retaining arms.

8. The actuator according to claim 7, wherein the setting lever comprises an engaging portion that interacts with the adjustment device to lock and unlock the drawer via the bolting device.

9. The actuator according to claim 8, wherein the adjustment device comprises a pre-tensioned control slide valve, which includes a receiving portion into which the engaging portion of the setting lever can mesh, and a control segment for actuating the bolting device.

10. The actuator according to claim 9, wherein the control slide valve is pre-tensioned into a locked state with the bolting device by a spring, and pre-tensioned out of the locked state by a spring.

11. The actuator according to one claim 1, wherein the bolting device comprises a bolt, which is pre-tensioned in a locked state with the drawer by a spring, coupled with the bolt and comprises a barrier section for engaging a latching attachment of the drawer to lock the drawer in the retracted state.

12. The actuator according to claim 11, wherein the bolt further comprises a control segment, which interacts with a control segment of a control slide valve of the adjustment device in such a way that movement of the control slide valve causes the barrier section of the bolt to disengage from the latching attachment of the drawer.

13. The actuator according to claim 12, wherein the control slide valve is pre-tensioned by a spring into an initial state in which the control segment of the control slide valve is engaged with the control segment of the bolt.

14. The actuator according to claim 13, wherein the control slide valve is also acted upon by a spring, which pre-tensions the control slide valve in a direction away from the initial state.

15. An actuator for moving a drawer and a cover in a vehicle, wherein the cover can be moved between a closed state for covering an opening in an interior panel part and an open state for uncovering the opening, and wherein the drawer can be moved between a retracted state and an extended state in which the drawer protrudes from the opening, the actuator comprising:
   a guiding device that guides the drawer during movement between the retracted and extended states;
   a cover opening and closing device that opens and closes the cover; and
   an unlocking and locking device that unlocks and locks and drawer, wherein the unlocking and locking device comprises:
   a bolting device that locks the drawer in the retracted state; and
   an adjustment device that interacts with the bolting device and cover opening and closing device in such a way that, with the drawer in the retracted state, moving the cover toward the open state causes the adjustment device to release the drawer by moving the bolting device so that the drawer can be moved out of the opening,
   wherein the bolting device comprises a bolt, which is pre-tensioned in a locked state with the drawer by a spring coupled with the bolt and comprises a barrier section for engaging a latching attachment of the drawer to lock the drawer in the retracted state.

16. The actuator according to claim 15, wherein the bolt further comprises a control segment, which interacts with a control segment of a control slide valve of the adjustment device in such a way that movement of the control slide valve causes the barrier section of the bolt to disengage from the latching attachment of the drawer.

17. The actuator according to claim 16, wherein the control slide valve is pre-tensioned by a spring into an initial state in which the control segment of the control slide valve is engaged with the control segment of the bolt.

18. The actuator according to claim 17, wherein the control slide valve is also acted upon by a spring, which pre-tensions the control slide valve in a direction away from the initial state.

* * * * *